US012034245B2

(12) United States Patent
Weaver et al.

(10) Patent No.: US 12,034,245 B2
(45) Date of Patent: Jul. 9, 2024

(54) HINGED CONNECTOR FEATURE FOR TERMINAL RETAINMENT AND POSITION ASSURANCE FOR HIGH MATING CYCLE APPLICATIONS

(71) Applicant: TE Connectivity Solutions GmbH, Schaffhausen (CH)

(72) Inventors: Brian Keith Weaver, Middletown, PA (US); Andrew B. Fortier, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 59 days.

(21) Appl. No.: 17/838,422

(22) Filed: Jun. 13, 2022

(65) Prior Publication Data

US 2023/0402786 A1 Dec. 14, 2023

(51) Int. Cl.
*H01R 13/50* (2006.01)
*H01R 13/426* (2006.01)

(52) U.S. Cl.
CPC ......... *H01R 13/501* (2013.01); *H01R 13/426* (2013.01)

(58) Field of Classification Search
CPC .. H01R 13/501; H01R 13/426; H01R 13/113; H01R 2103/00; H01R 13/422
See application file for complete search history.

(56) References Cited

U.S. PATENT DOCUMENTS

| | | | | |
|---|---|---|---|---|
| 5,122,081 | A | 6/1992 | Bogiel et al. | |
| 5,181,857 | A * | 1/1993 | Layser ................ | H01R 13/633 439/153 |
| 6,024,605 | A | 2/2000 | Beck, Jr. et al. | |
| 7,682,180 | B2 | 3/2010 | Brown et al. | |
| 9,608,355 | B2 | 3/2017 | Nagai et al. | |
| 10,224,665 | B2 | 3/2019 | Iida | |
| 10,601,164 | B2 | 3/2020 | Garver et al. | |
| 10,770,827 | B2 | 9/2020 | Tsai | |

FOREIGN PATENT DOCUMENTS

| | | | |
|---|---|---|---|
| WO | 1998052252 | A1 | 11/1998 |

* cited by examiner

*Primary Examiner* — Travis S Chambers

(57) ABSTRACT

An electrical connector having a housing with positioning projections extending from a first surface. A terminal receiving cavity is provided in the housing. An opening is provided in the first surface and extends to the terminal receiving cavity. A terminal is positioned in the terminal receiving cavity. The terminal has a facing securing face. A terminal retainer is movably mounted to the first surface of the housing. The terminal retainer has a terminal retention projection and retainer positioning projections. As the terminal retainer is moved to a second position, the terminal retention projection cooperates with the securing face of the terminal to prevent movement of the terminal and the retainer positioning projections of the terminal retainer cooperate with the positioning projections of the housing to prevent the movement of the terminal retainer in a direction which is in line with a longitudinal axis of the housing.

18 Claims, 4 Drawing Sheets

HINGED CONNECTOR FEATURE FOR TERMINAL RETAINMENT AND POSITION ASSURANCE FOR HIGH MATING CYCLE APPLICATIONS

FIELD OF THE INVENTION

The present invention relates to a hinged terminal retention member for use in an electrical connector. In particular, the invention relates to a hinged terminal retention member which retains a terminal in the housing of the connector and prevents terminal back-out.

BACKGROUND OF THE INVENTION

A variety of electrical connector systems are in use that include a dielectric housing having a plurality of terminal-receiving cavities within which are mounted a plurality of terminal contacts. Improper installation or loading of terminal contacts inside the connector housing may create significant problems for an installer or an end user when undiagnosed at the time of assembly. Terminal position assurance (TPA) elements or secondary locks are commonly used in connectors to secure inserted terminal contacts in their respective connector cavities in proper position for electrically mating with the terminal contacts of a mating connector. Such connector systems are widely used in the automotive industry where various automotive systems require more secure retention of the terminal contacts within the connector so that the terminal contacts are less likely to vibrate out or be inadvertently removed, such as during the servicing of a nearby component or system.

Known connector systems with secondary locks are not without disadvantages. For instance, such systems require that multiple parts be provided at assembly stations, there is the risk of lost or misplaced parts, and added costs are associated with the production of separate parts, etc. Typically, the housing and the TPA or secondary lock are molded in separate molds and then pre-assembled to a pre-staged condition, requiring an assembly process and equipment. In addition, special packaging may also be required to assure that the pre-staged condition of the assembly is not violated during shipping to a harness maker or other customer.

In addition, known connector systems which include a TPA include internal latches with the cavity geometry. Depending on the space and geometry of the cavities, the internal latches may by small and not able to properly secure the terminals over many cycles.

A need remains for a low cost reliable connector system including secondary locking and terminal retention features that they may be manufactured with reduced molding, assembly, and packaging costs.

It would therefore be beneficial to provide a terminal retention member which is robust enough to retain a terminal in the housing of the connector and prevents terminal back-out of the terminal and the terminal is mated and unmated over many cycles. In addition, it would also be desirable to provide a terminal retention member which is integrally molded with the housing of the connector to reduced molding, assembly, and packaging costs.

SUMMARY OF THE INVENTION

An object of the invention is to provide a terminal retention device which can withstand a high number of mating cycles (for example, greater than 5,000) without failing, thereby preventing the terminal from partially or completely backing-out of the mating area of the electrical connector.

An object of the invention is to provide a terminal retention device which is integrally molded with the housing of the electrical connector thereby reducing the molding, assembly, and packaging costs of the electrical connector.

An object of the invention is to provide a terminal retention device which is retained in position to prevent the movement of the terminal, and which is held in place in the connector housing to prevent the unwanted removal of the terminal retention device even if the living hinge breaks.

An embodiment is directed to an electrical connector having a housing with a mating end and an oppositely facing conductor receiving end. The housing having a first surface and an oppositely facing second surface, with positioning projections extending from the first surface. A terminal receiving cavity extends from the conductor receiving end to the mating end. An opening is provided in the first surface and extends to the terminal receiving cavity. A terminal is positioned in the terminal receiving cavity. The terminal has a mating portion and a conductor terminating portion. The mating portion has a mating face and an oppositely facing securing face. A terminal retainer is movably mounted to the first surface of the housing. The terminal retainer has a terminal retention projection and retainer positioning projections. As the terminal retainer is moved to a second position, the terminal retention projection cooperates with the securing face of the terminal to prevent movement of the terminal. As the terminal retainer is moved to the second position, the retainer positioning projections of the terminal retainer cooperate with the positioning projections of the housing to prevent the movement of the terminal retainer in a direction which is in line with a longitudinal axis of the housing.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
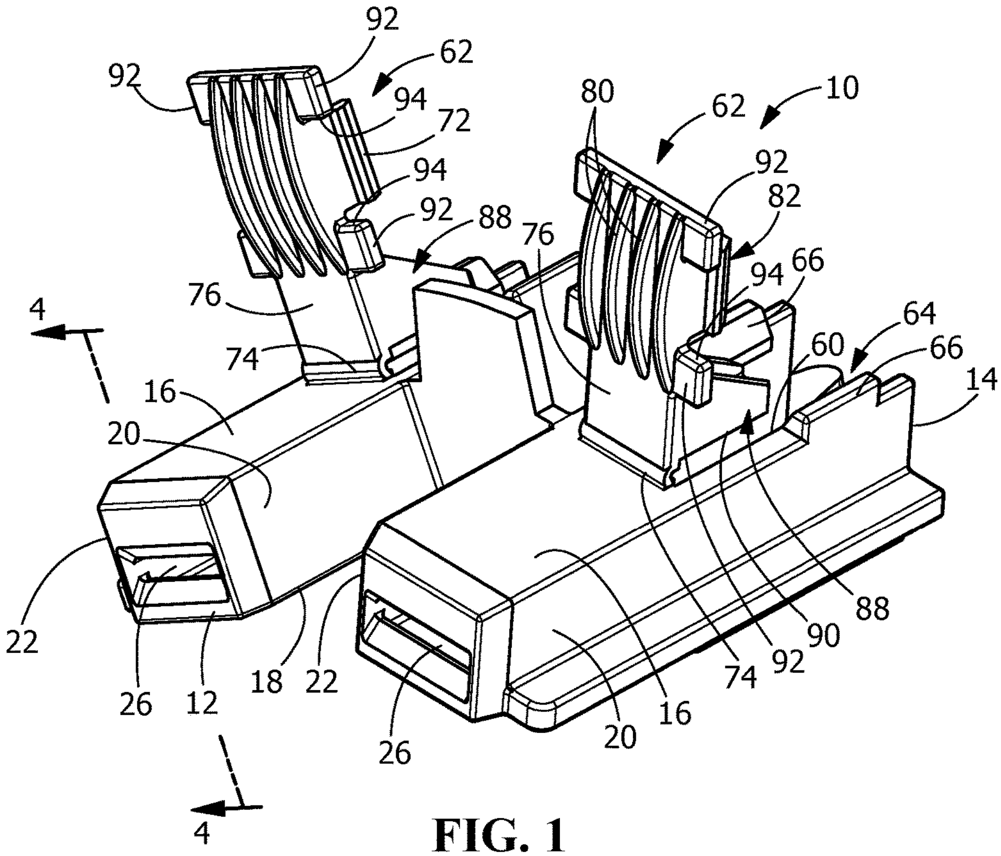
FIG. 1 is a perspective view of an illustrative electrical connector with an illustrative terminal retention member or device shown in an open position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
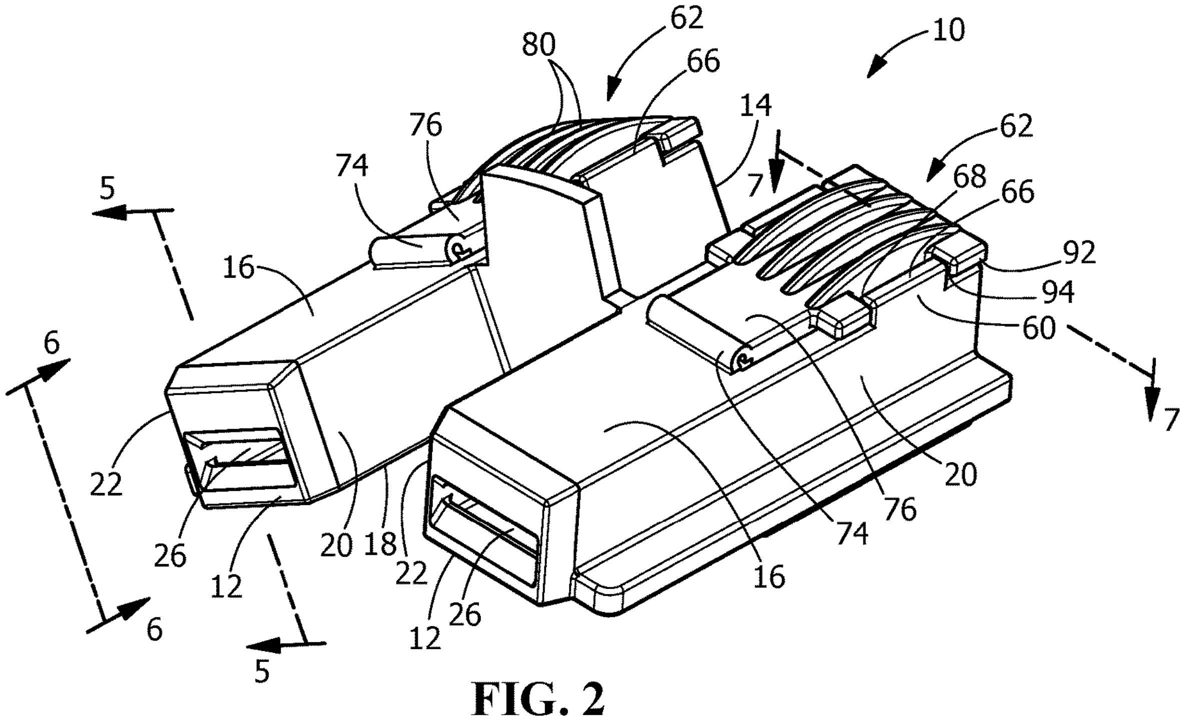
FIG. 2 is a perspective view of the electrical connector of FIG. 1 with the terminal retention member or device shown in a closed or locked position.
Figure 4:
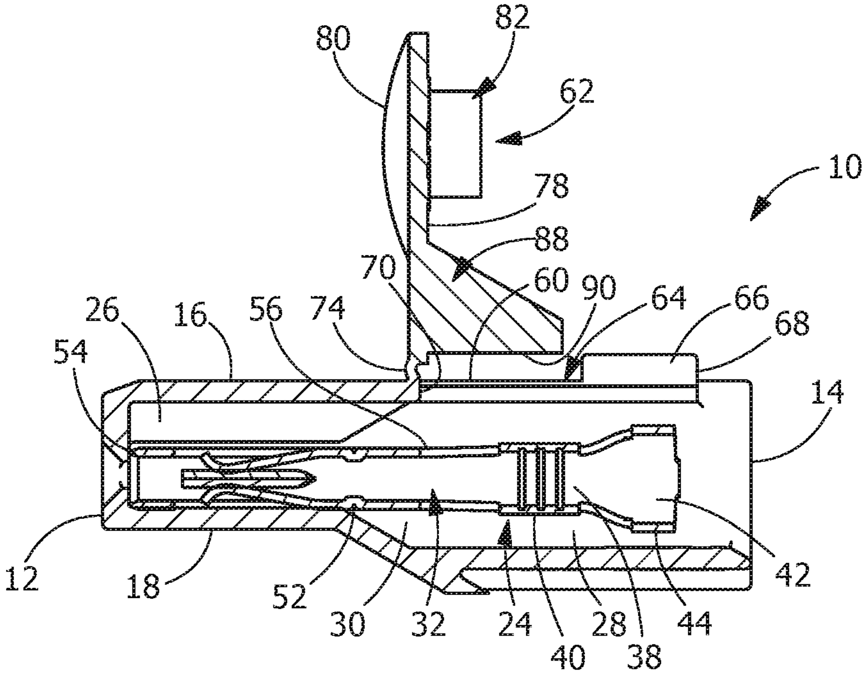
FIG. 4 is a cross sectional view taken along line 4-4 of FIG. 1.
Figure 5:
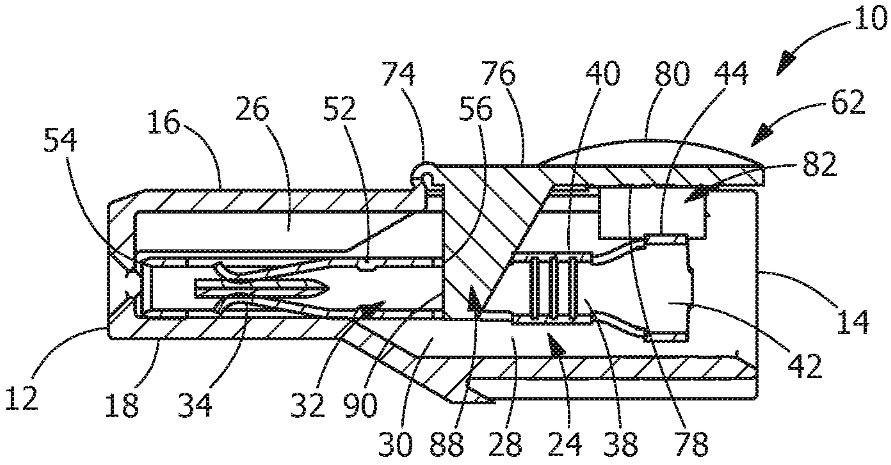
FIG. 5 is a cross sectional view taken along line 5-5 of FIG. 2.

As shown in FIGS. 1 and 2, an illustrative female or receptacle connector has a housing 10 has a mating end 12 and an oppositely facing conductor receiving end 14. A top or first surface 16 and an oppositely facing bottom or second surface 18 extend between the mating end 12 and the conductor receiving end 14. Side surfaces 20 and 22 extend between the first surface 16 and the second surface 18 and extend between the mating end 12 and the conductor receiving end 14. As shown in FIGS. 4 and 5, terminal receiving cavities 24 are provided in the housing 10 and extend from the conductor receiving end 14 to the mating end 12. The receptacle housing 10 is meant to be illustrative, as different configurations of housings may be used, including, but not limited to, male or tab housings.

In the illustrative embodiment shown, the housing 10 has two terminal receiving cavities 24 which are parallel to each other. Each terminal receiving cavity 24 has a terminal positioning portion 26 with a reduced diameter proximate the mating end 12. A conductor receiving portion 28, with a larger diameter extends from proximate the terminal positioning portion 26 to the conductor receiving end 14 of the housing 10. A transition portion 30 is provided between the terminal positioning portion 26 and the conductor receiving portion 28. The transition portion 30 has a sloped or angled surface to transition between the diameter of the conductor receiving portion 28 and the terminal positioning portion 26. In the embodiment shown, the terminal positioning portion 26, the conductor receiving portion 28 and the transition portion 30 have relatively smooth walls, with no projections or lances extending therefrom. This allows a terminal 32 to be inserted into each terminal receiving cavity 24 with minimal force.

In the illustrative embodiment shown, the terminal 32 is a female terminal formed from conductive material. However, in other embodiments, the terminal may have different configurations, including, but not limited to, a male or tab configuration.

The terminal 32 has a mating portion 34 and a conductor terminating portion 36. The conductor terminating portion 36 has a first crimping portion 38 with first crimping arms 40 and a second crimping portion 42 with second crimping arms 44. The first crimping arms 40 of the first crimping portion 38 are crimped to the center conductor (not shown) of a cable or wire (not shown) and the second crimping arms 44 of the second crimping portion 42 are crimped to the insulative jacket (not shown) of the cable or wire. This physically and electrically secures the cable to the terminal 32, as is known in the industry.

The mating portion 34 of each terminal 32 has a rectangular shape and is configured to receive a mating terminal therein. Lances 52 extend from the sides of the mating portion 34. The lances 52 engage the walls of the terminal positioning portion 26 of the terminal receiving cavity 24 to initially retain the terminal 32 is position in the terminal receiving cavity 24.

The mating portion 34 of each terminal 32 has a mating face 54 and an oppositely facing securing face 56. The securing face 56 extends in a direction which is essentially perpendicular to a longitudinal axis of the terminal 32.

As shown in FIGS. 1 and 3 through 5, the housing 10 has a terminal retention portion 60 with terminal retainers 62 positioned in line with the terminal receiving cavities 24. In the illustrative embodiment shown, the terminal retainers 62 are provided on the top or first surface 16 of the housing 10. The terminal retainers 62 are formed integrally with the housing 10.

Referring to FIG. 4, openings 64 are formed in the top or first surface 16 of the housing 10. The openings 64 extend from the top or first surface 16 into respective conductor receiving portions 28 of the terminal receiving cavities 24. The openings 64 extend from proximate the transition portion 30 of the terminal receiving cavities 24 to the conductor receiving end 14 of the housing 10. When properly positioned, a portion of the conductor terminating portions 36 of the terminals 32 are positioned below the openings 64 or are exposed in the openings 64. The securing face 56 of the mating portion 34 of each terminal 32 is positioned proximate to or in line with a respective opening 64.

Positioning projections 66 extend from the top or first surface 16 in a direction away from the bottom or second surface 18. The positioning projections 66 on either side of each of the openings 64. The positioning projections 66 have shoulders 68 which extend at approximately a right angle from the top or first surface 16. Wall surfaces at the front of the openings 64 are formed as rotation regulating surfaces 70. Each rotation regulating surface 70 is disposed to be flush with or slightly on the rear end side from the securing face 56 of the mating portion 34 of each terminal 32.

A pair of locking projections 72 extend from sidewalls of each opening 64 into the openings 64. In the illustrative embodiment shown, the locking projections 72 are positioned to proximate the positioning projections 66.

As shown in FIGS. 3 through 7, the terminal retainers 62 have a generally rectangular configuration. Each terminal retainer 62 is attached to the housing 10 by a hinge member 74 which allows the terminal retainer 62 to be moved or rotated from a first or open position, as shown in FIG. 4, to a second or closed position, as shown in FIG. 5.

Each terminal retainer 62 has a first or top surface 76 and an oppositely facing second or bottom surface 78. The top surface 76 has ergonomically designed ribs 80 which extend from the top surface 76 in a direction away from the bottom surface 78. In the embodiment shown, the ribs 80 have an arcuate configuration for ease of operator engagement.

Latches 82 extend from the bottom surface 78 in a direction away from the top surface 76. The latches 82 are positioned on either side of the each of the terminal retainers

Figure 6:
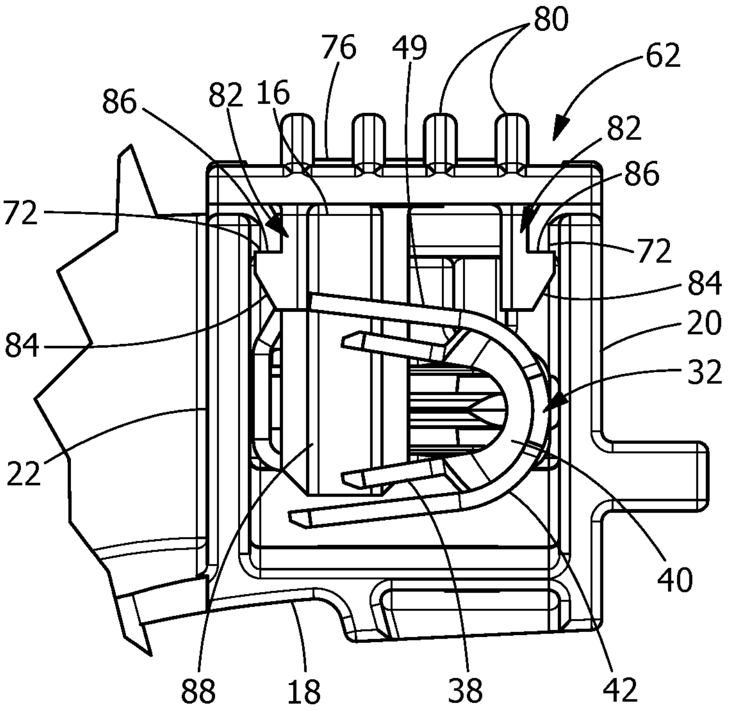
FIG. 6 is a cross sectional view taken along line 6-5 of FIG. 2.

62. As shown in FIG. 6, each latch 82 has a lead-in surface 84 and a latching shoulder 86. The latches 82 are relatively stiff and do not deflect significantly when the terminal retainer is moved to the closed position, as will be more fully described.

Each terminal retainer 62 has a terminal retention projection 88 which extends from the bottom surface 78 in a direction away from the top surface 76. The terminal retention projection 88 is spaced from the latches 82 and is provided proximate the hinge member 74. The terminal retention projection 88 has a terminal engagement surface 90. The terminal engagement surface 90 extends at essentially 90 degrees from the bottom surfaces 78.

As shown in FIGS. 1-3 and 7, retainer positioning projections 92 extend from the sides of each terminal retainer 62. In the illustrative embodiment shown, two retainer positioning projections 92 extend from each side of each terminal retainer 62. The retainer positioning projections 92 are positioned on either side of the latches 82. The retainer positioning projections 92 have positioning shoulders 94 which extend at essentially 90 degrees from the side surfaces of the terminal retainer 62.

Figure 3:
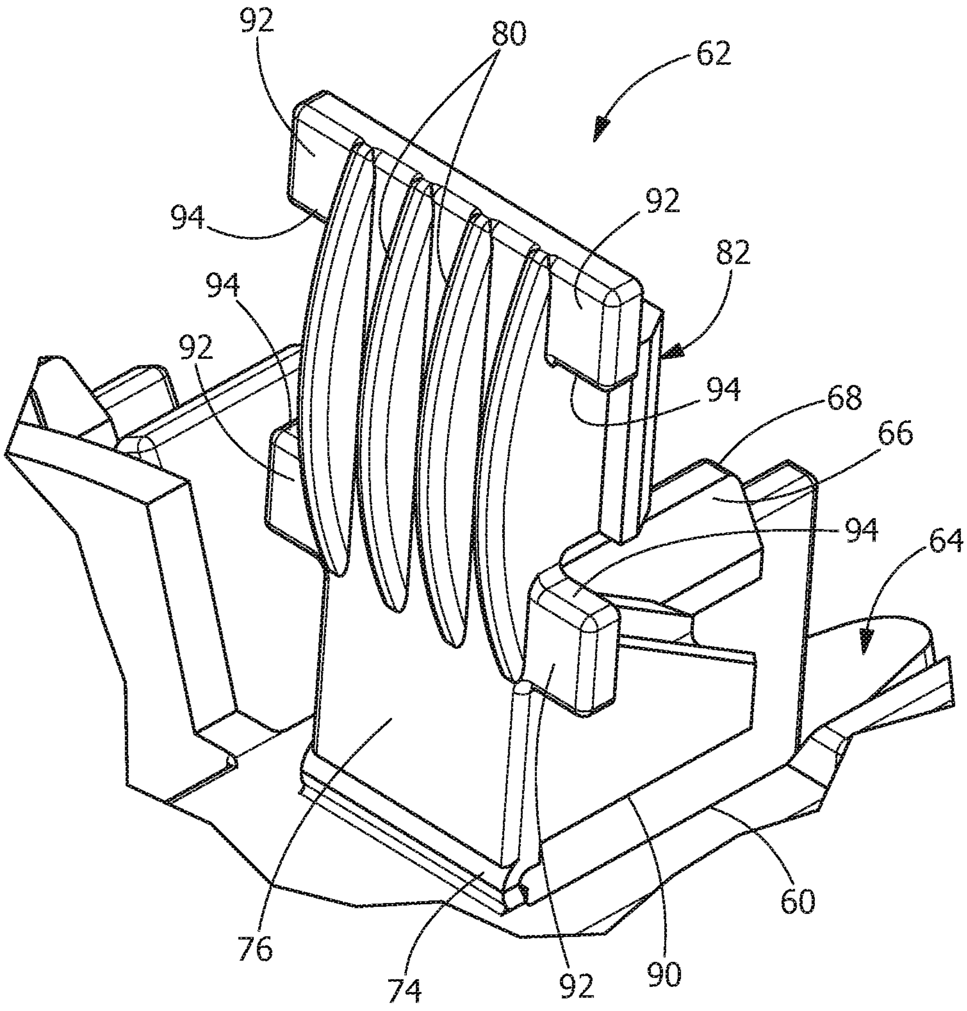
FIG. 3 is an enlarged perspective view of the terminal retention member or device of FIG. 1.

During assembly, the terminal retainer 62 is provided in the position shown in FIGS. 1, 3 and 5. In this open position, the terminal retainer 62 is not positioned in the opening 64 formed in the top or first surface 16 of the housing 10. However, the terminal retainer 62 is maintained in close proximity to the opening 64 by the hinge member 74.

In the open position, no portion of the terminal retainer is positioned in the terminal receiving cavity 24, allowing the terminal 32 to be inserted into the terminal receiving cavity 24 with little or no obstruction or resistance. During assembly, the terminal 32 is inserted into the terminal receiving cavity 24 through the conductor receiving end 14 of the housing 10. Insertion continues until the mating portion 34 of the terminal 32 is positioned in the terminal positioning portion 26 of the terminal receiving cavity 24. In this position, the securing face 56 of the terminal 32 is positioned proximate to the transition portion 30 of the terminal receiving cavity 24. The securing face 56 is also positioned in line with the opening 64 formed in the top or first surface 16 of the housing 10.

With the terminal 32 properly positioned, the terminal retainers 62 of the terminal retention portion 60 of the housing 10 are rotated or pivoted about hinge member 74. As this occurs, the terminal retainer 62 is moved from the open position shown in FIG. 1 to the closed or locked position shown in FIG. 2.

As the terminal retainer 62 is moved from the open position to the closed position, the terminal engagement surface 90 of the terminal retention projection 88 is moved through the opening 64 and into the terminal receiving cavity 24. The terminal retention projection 88 is first moved into the conductor receiving portion 28 of the terminal receiving cavity 24 and then moved into the transition portion 30 of the terminal receiving cavity 24.

If the terminal 32 is not fully inserted in the terminal receiving cavity 24, the terminal engagement surface 90 may engage the securing face 56 of the terminal 32. As the terminal retainer 62 is moved from the conductor receiving portion 28 to the transition portion 30, the terminal engagement surface 90 forces the terminal 32 to the fully inserted position. If the terminal is prevented from being fully inserted, the engagement of the securing face 56 with the terminal engagement surface 90 will prevent the terminal retainer 62 from being moved to the closed position. The interaction between the terminal 32 and the terminal retainer 62 allows the terminal retainer 62 to function as a terminal position assurance member.

With the terminal 32 properly positioned, the terminal retainer 62 can be moved to the closed position, as shown in FIGS. 2 and 5 through 7. In this position, the terminal engagement surface 90 of the terminal retention projection 88 is positioned in engagement with or proximate to the securing face 56 of the terminal 32, thereby preventing the terminal 32 from being moved toward the conductor receiving end 14 of the housing 10 when a mating terminal (not shown) is mated with the mating portion 34 of the terminal 32.

As the terminal retainer 62 is moved to the closed position, the lead-in surface 84 of the latches 82 engage the locking projections 72 which extend from sidewalls of the opening 64. As the latches 82 are relatively stiff, the engagement of the latches 82 with the locking projections 72 causes the locking projections to flex outward, allowing the continued insertion of the latches 82 and the terminal retainer 62.

Once in the closed position, the latching shoulders 86 are moved beyond the locking projections 72, allowing the locking projections 72 to resiliently return toward their unstressed position. In the position, the latching shoulders 86 engage and end of the locking projections 72 to prevent the unwanted movement of the terminal retainer 62 from the closed position to the open position.

Figure 7:
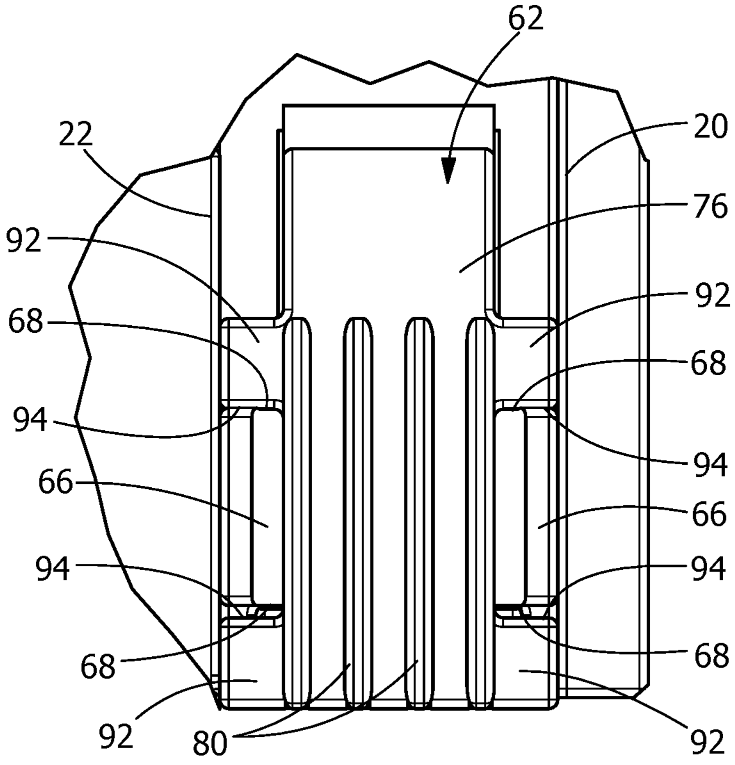
FIG. 7 is a top view of the terminal retention member shown in the closed or locked position.

When in the closed position, the positioning shoulders 94 of two retainer positioning projections 92 on each side of the terminal retainer 64 are positioned proximate to or in engagement with respective shoulders 68 of the positioning projections 66 of the housing 10, as is shown in FIG. 7. The cooperation of the positioning shoulders 94 of the retainer positioning projections 92 and the shoulders 68 of the positioning projections 66 properly position the terminal retainer 64 relative to the housing 10.

The engagement of the positioning shoulders 94 of the retainer positioning projections 92 and the shoulders 68 of the positioning projections 66 limits or prevents movement of the terminal retainer 64 relative to the housing 10 in a direction which is in line with a longitudinal axis of the housing 10. As the terminal retainer 64, including the terminal engagement surface 90 of the terminal retention projection 88, is prevented from movement relative to the housing, the terminal 31 which engaged the terminal engagement surface 90 of the terminal retention projection 88 is also prevented from movement, even as a mating terminal is mated with terminal 32. Consequently, a stable and reliable mechanical and electrical connection is established between the terminal 32 and the mating terminal, even if a large mating force is applied by the mating terminal.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector comprising:

housing having a mating end and an oppositely facing conductor receiving end, the housing having a first surface and an oppositely facing second surface, positioning projections extend from the first surface;

a terminal receiving cavity extending from the conductor receiving end to the mating end;

an opening provided in the first surface, the opening extending to the terminal receiving cavity;

a terminal positioned in the terminal receiving cavity, the terminal having a mating portion and a conductor terminating portion, the mating portion having a mating face and an oppositely facing securing face;

a terminal retainer movably mounted to the first surface of the housing, the terminal retainer having a terminal retention projection and retainer positioning projections;

the terminal receiving cavity has a terminal positioning portion proximate the mating end, a conductor receiving portion proximate the terminal positioning portion of the conductor receiving end, and a transition portion provided between the terminal positioning portion and the conductor receiving portion;

the opening in the first surface extends from proximate the transition portion of the terminal receiving cavity to the conductor receiving end of the housing;

wherein as the terminal retainer is moved to a second position, the terminal retention projection cooperates with the securing face of the terminal to prevent movement of the terminal;

wherein as the terminal retainer is moved to the second position, the retainer positioning projections of the terminal retainer cooperate with the positioning projections of the housing to prevent the movement of the terminal retainer in a direction which is in line with a longitudinal axis of the housing.

2. The electrical connector as recited in claim 1, wherein the conductor receiving portion has a larger diameter than the terminal positioning portion, the transition portion has a sloped or angled surface to transition between the diameter of the conductor receiving portion and the terminal positioning portion.

3. The electrical connector as recited in claim 1, wherein the securing face of the terminal extends in a direction which is essentially perpendicular to a longitudinal axis of the terminal.

4. The electrical connector as recited in claim 1, wherein the terminal retainer has a top surface with ergonomic ribs.

5. The electrical connector as recited in claim 1, wherein the terminal retention projection extends from a bottom surface of the terminal retainer in a direction away from a top surface, the terminal retention projection has a terminal engagement surface, the terminal engagement surface extends at essentially 90 degrees from the bottom surfaces.

6. The electrical connector as recited in claim 1, wherein the opening in the first surface extends from proximate the transition portion of the terminal receiving cavity to the conductor receiving end of the housing.

7. The electrical connector as recited in claim 6, wherein a portion of the conductor terminating portion of the terminals is positioned below the opening, the securing face of the mating portion is positioned proximate to or in line with the opening.

8. The electrical connector as recited in claim 1, wherein the terminal retainer is formed integrally with the housing.

9. The electrical connector as recited in claim 8, wherein the terminal retainer is attached to the housing by a hinge member which allows the terminal retainer to be moved from a first or open position to a second or closed position.

10. The electrical connector as recited in claim 9, wherein the retainer positioning projections are spaced from the hinge member.

11. The electrical connector as recited in claim 10, wherein the terminal retention projection is positioned between the retainer positioning projections and the hinge member.

12. An electrical connector comprising:

housing having a mating end and an oppositely facing conductor receiving end, the housing having a first surface and an oppositely facing second surface, positioning projections extend from the first surface, the positioning projections extend from the first surface in a direction away from the second surface, the positioning projections positioned on either side of the opening;

a terminal receiving cavity extending from the conductor receiving end to the mating end;

an opening provided in the first surface, the opening extending to the terminal receiving cavity;

a terminal positioned in the terminal receiving cavity, the terminal having a mating portion and a conductor terminating portion, the mating portion having a mating face and an oppositely facing securing face;

a terminal retainer movably mounted to the first surface of the housing, the terminal retainer having a terminal retention projection and retainer positioning projections;

wherein as the terminal retainer is moved to a second position, the terminal retention projection cooperates with the securing face of the terminal to prevent movement of the terminal;

wherein as the terminal retainer is moved to the second position, the retainer positioning projections of the terminal retainer cooperate with the positioning projections of the housing to prevent the movement of the terminal retainer in a direction which is in line with a longitudinal axis of the housing.

13. The electrical connector as recited in claim 12, wherein the positioning projections have shoulders which extend at approximately a right angle from the first surface.

14. The electrical connector as recited in claim 13, wherein the retainer positioning projections extend from the sides of each terminal retainer, the retainer positioning projections have positioning shoulders which extend at essentially 90 degrees from the side surfaces of the terminal retainer, wherein when the terminal retainer is in the second position, the positioning shoulders of the retainer positioning projections are positioned proximate to or in engagement with the shoulders of the positioning projections to properly position the terminal retainer relative to the housing.

15. An electrical connector comprising:

housing having a mating end and an oppositely facing conductor receiving end, the housing having a first surface and an oppositely facing second surface, positioning projections extend from the first surface;

a terminal receiving cavity extending from the conductor receiving end to the mating end;

an opening provided in the first surface, the opening extending to the terminal receiving cavity;

a terminal positioned in the terminal receiving cavity, the terminal having a mating portion and a conductor terminating portion, the mating portion having a mating face and an oppositely facing securing face;

a terminal retainer movably mounted to the first surface of the housing, the terminal retainer having a terminal retention projection and retainer positioning projections;

a rotation regulating surface is provide at a front of the opening, the rotation regulating surface is disposed to be flush with or slightly on the rear end side from the securing face of the mating portion of each terminal;

wherein as the terminal retainer is moved to a second position, the terminal retention projection cooperates with the securing face of the terminal to prevent movement of the terminal;

wherein as the terminal retainer is moved to the second position, the retainer positioning projections of the terminal retainer cooperate with the positioning projections of the housing to prevent the movement of the terminal retainer in a direction which is in line with a longitudinal axis of the housing.

16. An electrical connector comprising:

housing having a mating end and an oppositely facing conductor receiving end, the housing having a first surface and an oppositely facing second surface, positioning projections extend from the first surface;

a terminal receiving cavity extending from the conductor receiving end to the mating end;

an opening provided in the first surface, the opening extending to the terminal receiving cavity;

a pair of locking projections extend from sidewalls of the opening;

a terminal positioned in the terminal receiving cavity, the terminal having a mating portion and a conductor terminating portion, the mating portion having a mating face and an oppositely facing securing face;

a terminal retainer movably mounted to the first surface of the housing, the terminal retainer having a terminal retention projection and retainer positioning projections;

wherein as the terminal retainer is moved to a second position, the terminal retention projection cooperates with the securing face of the terminal to prevent movement of the terminal;

wherein as the terminal retainer is moved to the second position, the retainer positioning projections of the terminal retainer cooperate with the positioning projections of the housing to prevent the movement of the terminal retainer in a direction which is in line with a longitudinal axis of the housing.

17. The electrical connector as recited in claim 16, wherein latches extend from a bottom surface of the terminal retainer, the latches are positioned on either side of the each of the terminal retainer, the latches have lead-in surfaces and latching shoulders, when in a second position, the latching shoulders of the latches cooperate with the locking projections to retain the terminal retainer in the second position.

18. The electrical connector as recited in claim 17, wherein the latches are stiffer than the locking projection, wherein as the terminal retainer is moved to a second position, the engagement of the latches with the locking projections causes the locking projections to flex outward.

* * * * *